US012668017B2

(12) United States Patent
Petermann

(10) Patent No.: US 12,668,017 B2
(45) Date of Patent: Jun. 30, 2026

(54) MEASURING ARRANGEMENT INCLUDING A BLOW-MOLDING EXTRUDER, METHOD FOR MEASURING A MOLTEN TUBE OR A BLOW-MOLDING PRODUCT AS WELL AS A BLOW-MOLDING EXTRUDING METHOD

(71) Applicant: CiTEX Holding GmbH, Melle (DE)

(72) Inventor: Jan Hendrik Petermann, Melle (DE)

(73) Assignee: CiTEX Holding GmbH, Melle (DE)

( * ) Notice: Subject to any disclaimer, the term of this patent is extended or adjusted under 35 U.S.C. 154(b) by 359 days.

(21) Appl. No.: 18/299,094

(22) Filed: Apr. 12, 2023

(65) Prior Publication Data
US 2023/0321893 A1     Oct. 12, 2023

(30) Foreign Application Priority Data
Apr. 12, 2022     (DE) ..................... 10 2022 108 942.8

(51) Int. Cl.
*B29C 49/78*          (2006.01)
*B29C 49/04*          (2006.01)

(52) U.S. Cl.
CPC .......... *B29C 49/78* (2013.01); *B29C 49/0411* (2022.05); *B29C 2049/78715* (2022.05); *B29C 2049/7875* (2022.05); *B29C 2049/78755* (2022.05)

(58) Field of Classification Search
CPC ...... B29C 49/0411; B29C 49/78; G01B 11/06
See application file for complete search history.

(56) References Cited

U.S. PATENT DOCUMENTS

| 5,102,588 | A | * | 4/1992 | Feuerherm | ........ B29C 49/04112 |
| | | | | | 264/40.5 |
| 10,584,957 | B2 | | 3/2020 | Thiel | |
| 2005/0023470 | A1* | | 2/2005 | Ferguson | ........... G01N 21/3581 |
| | | | | | 250/358.1 |
| 2016/0010978 | A1* | | 1/2016 | Itsuji | .................... G01B 11/002 |
| | | | | | 250/341.8 |

(Continued)

FOREIGN PATENT DOCUMENTS

| CN | 108458987 | A | * | 8/2018 | ......... G01N 21/3581 |
| DE | 3816273 | A1 | | 11/1989 | |

(Continued)

OTHER PUBLICATIONS

Machine translation of CN108458987A (Year: 2018).*

(Continued)

*Primary Examiner* — Ariella Machness
(74) *Attorney, Agent, or Firm* — Barnes & Thornburg LLP

(57)     ABSTRACT
The present disclosure relates to a measuring arrangement and a method for measuring a molten tube of an extrusion blow-molding process, including at least the following process steps: positioning or providing a THz measuring device including a THz sensor comprising an optical axis, extruding a molten tube by a blow-molding extruder along an extrusion axis, emitting a THz transmission beam from the THz sensor along its optical axis in such a manner that the front wall of the molten tube lies in a divergent beam area of the THz transmission beam behind the focus or in a convergent beam area before the focus, receiving a reflected beam reflected from the molten tube and evaluating a measuring signal in the reflected beam.

16 Claims, 3 Drawing Sheets

(56)            References Cited

U.S. PATENT DOCUMENTS

| | | | |
|---|---|---|---|
| 2018/0347963 A1 * | 12/2018 | Thiel | .................... G01B 11/245 |
| 2022/0146251 A1 | 5/2022 | Böhm | |
| 2022/0412723 A1 * | 12/2022 | Strey | ....................... B29C 48/10 |

FOREIGN PATENT DOCUMENTS

| | | | | |
|---|---|---|---|---|
| DE | 102009058361 | B3 | 6/2011 | |
| DE | 102019108299 | A1 * | 10/2020 | ........... G01B 11/026 |
| DE | 102019108299 | B4 | 1/2021 | |
| WO | 2011072650 | A1 | 6/2011 | |
| WO | 2017101906 | A1 | 6/2017 | |

OTHER PUBLICATIONS

Machine translation of DE102019108299A1 (Year: 2020).*
European Search Report for European Countepart EP23167281
dated Aug. 7, 2023, 2 pages.

* cited by examiner

MEASURING ARRANGEMENT INCLUDING A BLOW-MOLDING EXTRUDER, METHOD FOR MEASURING A MOLTEN TUBE OR A BLOW-MOLDING PRODUCT AS WELL AS A BLOW-MOLDING EXTRUDING METHOD

PRIORITY CLAIM

This application claims priority to German Patent Application No. DE 10 2022 108 942.8, filed Apr. 12, 2022, which is expressly incorporated by reference herein.

BACKGROUND

The present disclosure relates to a measuring arrangement including a blow-molding extruder, a method for measuring a molten tube or a blow-molding product as well as a blow-molding extruding method.

SUMMARY

According to the present disclosure, a measuring arrangement for measuring a molten tube or a blow-molding product allows for a secure measuring at a relatively small expenditure. A corresponding measuring method for measuring a molten tube or a blow-molding product is also disclosed.

In illustrative embodiments, a purposeful defocusing of the THz transmission beam is provided, where the focus is placed such that the wall of the molten tube or the blow-molding product lies in a divergent or even convergent beam region of the emitted THz transmission beam.

In illustrative embodiments, this allows the detect the wall to be covered with a beam geometry in which a divergent beam is sufficiently widely fanned out so as to illuminate a larger wall area of the molten tube or the blow-molding product and, further, the radiation covers the wall at a larger angle of the convergent or divergent bundle of rays.

In illustrative embodiments, the distance of the focus to the wall is adjusted preferably depending on the Rayleigh length. Hereby, the Rayleigh length deepens on the wavelength or respectively center frequency of the THz transmission beam and the beam geometry. The present disclosure recognizes that the Rayleigh length provides a helpful reference to determining the distance setting of the focal point to the wall. The distance setting may be selected to be, in particular, larger than the Rayleigh length, e.g., between the Rayleigh length and a pre-determined multiple of the Rayleigh length, e.g., tenfold, fivefold or double the Rayleigh length.

In the method according to the present disclosure and the device according to the present disclosure, the THz transmission beam is preferably emitted as a continuous or temporarily interrupted transmission beam, in particular, as a frequency modulated radar wave and/or pulsed transmission beam and/or direct time-of-flight measurement, in particular, in the frequency band of 0.01 or 0.05 to 50 THz, e.g., 0.05 to 5 THz.

The present disclosure also recognizes, in particular, that in THz—measuring in the frequency band of 0.05 to 50 THz, 20 or 5 THz and a suitable optics through the Rayleigh length distance values are determined which also represent suitable distances in practice. Thus, using an upstream lens and measuring distances of the THz sensor from the measured object Rayleigh lengths of e.g., 10 mm to 100 mm, in particular, 40 mm, are determined, i.e. values in a range of a few cm. Thus, by means of the THz radiation and a focusing of this type the measured object can be securely detected so as to securely detect, in blow-molding extrusion processes, the front wall and to securely determine the wall thickness of the front wall, and potentially further geometric properties.

In illustrative embodiments, using an angle adjusting means, the angle of the optical axis of the THz sensor is adjusted, in particular, in a plane perpendicular to the extrusion axis and/or in the plane determined by the optical axis and the extrusion axis. By virtue of this two-dimensional adjustment, it is possible, in particular, upon measuring the molten tube, to take better account of the occurring deformations of the molten tube than in the case of a one-dimensional adjustment, as used potentially with extruded pipes, because an extruded pipe generally bends only in the plane perpendicular to the extrusion axis.

The present disclosure may be provided both in continuous and also discontinuous blow-molding extrusion processes.

In illustrative embodiments, a regulation of the extrusion process is made possible, in which it is provided to control the blow-molding extruder depending on the measurement and in particular, the determination of the geometric properties of the molten tube, in particular, to adjust the ring gap or a barrel extruder, and/or the nozzle for putting out the jet of compressed air.

In illustrative embodiments, it is possible to measure even blow-molding products already formed, in that the blow-molding product is again arranged in the geometric region behind the focus, in particular, in the measuring distance of one Rayleigh length up to a pre-determined multiple of the Rayleigh length. Hereby, it is recognized that the measuring of a finished products is generally difficult because in this case the distance of the blow-molding product in relation to the measuring device should be adjusted precisely without any suitable receptacles or holder being provided for this purpose. By virtue of the de-focusing according to the present disclosure it is possible to securely detect a sufficiently large illuminated wall area of a blow-molding product.

In illustrative embodiments, the blow-molding extruder preferably receives granular source material and melts it via a barrel extruder, and puts out the polymer melt via the ring gap along an extrusion axis continuously as a molten tube.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
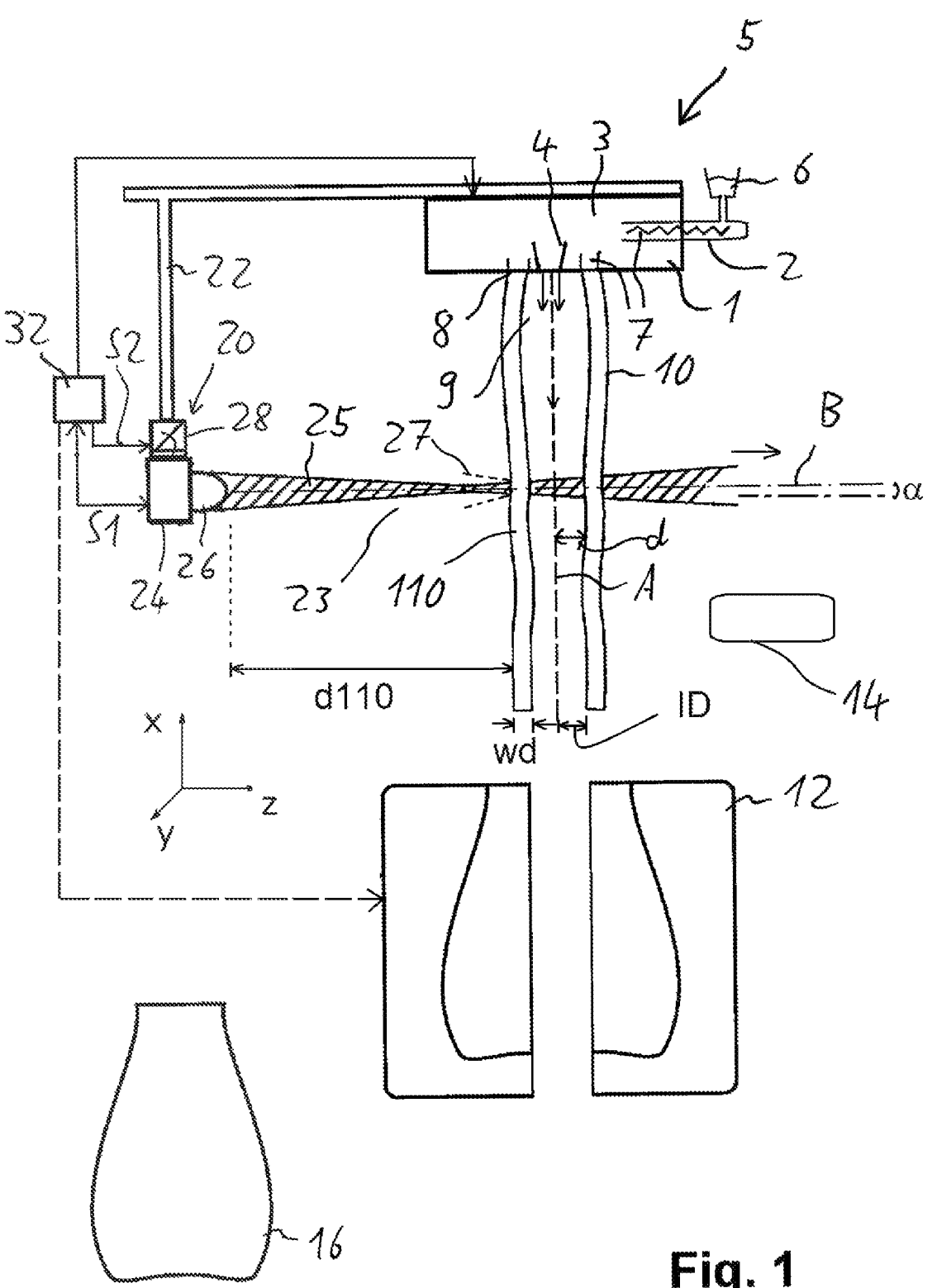
FIG. 1 shows an arrangement according to a first embodiment including a blow-molding extruder with extruded molten tube and tool.

According to FIG. 1 a measuring arrangement 5 is provided comprising a blow-molding extruder 1, a molten tube 10 put out by the blow-molding extruder 1, a THz measuring device 20 and, preferably, a tool 12. The blow-molding extruder 1 comprises, among other things, a barrel extruder 2, a tube head 3 and a variable nozzle 4. A granulate 6 is fed to the barrel extruder 2 so that the barrel extruder 2 squeezes out molten plastic material 7 through a ring gap 8 between the tube head 3 and the variable nozzle 4. Through the variable nozzle 4 pressurized air 9 is blown continuously along an extrusion axis A. Thus, the molten tube 10 is blown out as a preform along the extrusion axis A, whereby the molten tube 10 exhibits a wall thickness WD which, in particular, depends on the setting of the ring gap 8, the temperature of the molten plastic materials 7 and the jet of pressurized air put out by the variable nozzle 4. Thus, in particular, a distance ID of the molten tube 10 from the extrusion axis A is variable. The molten tube 10 constantly changes its position and its internal diameter or, respectively, external diameter, whereby it is also shaped asymmetrical or, respectively, not round in the circumferential direction.

The molten tube 10 is subsequently grabbed directly by a tool 12, or grabbed via a grab 14 and transported towards the tool 12. In FIG. 1, the tool 12 is arrange below the blow-molding extruder 1 or, respectively, the extruder head 3; in particular, however, the tool 12 may also grab the molten tube 10 directly below the extruder head 3 as soon as this has reached an intended length along the extrusion axis A.

Thereafter, the molten tube 10 is blown up in the tool 12 from the inside via the nozzle 4 and shaped by the interior shape of the tool 12 such that, subsequently, the blow-molding product 16 indicated in FIG. 1 is put out.

A THz measuring device 20 is firmly connected via a structure 22 to the blow-molding extruder 1 and comprises one or more THz transceivers 24 each emitting a THz transmission beam 25 along an optical axis B into a measuring space 23. Hereby, the optical axis B, in a default position, initially extends perpendicular to the extrusion axis A. The THz sensor 24 can be adjusted via an angle adjusting means 28 in relation to the structure 22 and thereby the blow-molding extruder 1. In particular, the angle adjusting means 28 allows for adjustment of an adjustment angle alpha, i.e., a pivoting in the plane perpendicular to the extrusion axis A, i.e., the plane YZ, and/or in the image plane of FIG. 1, i.e., the plane XZ, which is defined by the extrusion axis A and the THz sensor 24.

According to FIG. 1, in particular, a continuous blow-molding process may be provided wherein the molten tube 10 is put out continuously, possibly grabbed first by the grab 14 and forwarded, and then received by the tool 12 to form the blow-molding products 16. Alternatively, a discontinuous blow-molding process or, e.g., a continuous process with rotating blow molds may be used.

Figure 3:
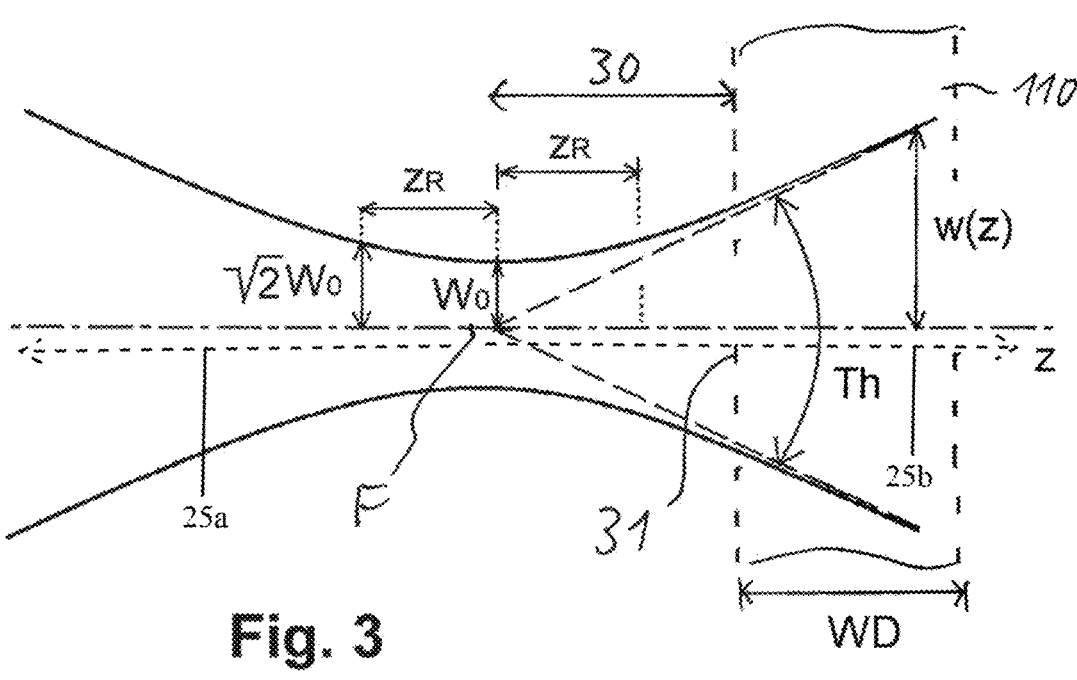
FIG. 3 shows a representation of the beam geometry of the THz transmission beam on the front wall to be measured.

The THz transmission beam 25 is focused onto a focus F which is a focal width FL apart from the THz sensor 24. To that end, the THz sensor 24 is provided with a lens 26 and, e.g., a transceiver chip. The THz transmission beam 25 forms a beam in the focus F the radius W0 of which is shown in FIG. 3. Thus, the THz transmission beam 25 forms a convergent beam area 25a before the focus and a divergent beam area 25b behind the focus F.

In order to securely capture the continuously moving and wobbling molten tube 10 the focus F is focused before the molten tube 10 so that the molten tube 10 is covered by the divergent beam area 25b. According to FIG. 3, the divergent beam area 25b covers an illuminated wall region 31 which is a set distance 30 away from the focus F. Thus, a distance d110 of the front wall 110 to the THz sensor 24 or, respectively, the optics 26 results from the sum of F and the set distance 30.

The Rayleigh length zR is defined such that with a distance of the Rayleigh length ZR from the focus F the radius W(Z) of the beam cone of the transmission beam 24 is larger by the factor √2 (root of two) than the radius W0 of the beam waist in the focus F. In the usual approximation of the transmission beam 24 as a Gaussian beam or, respectively, with Gaussian distribution perpendicular to the optical axis B of the beam, the Rayleigh length zR is represented by the following formula: According to FIG. 3, a Rayleigh length zR is defined by:

$$z_R = \frac{n \cdot \pi \cdot w_0^2}{\lambda_0}$$

where
  zR Rayleigh length
  n refractive index of the medium, i.e., here n=1 of air,
  W(Z) radius of the transmission cone
  W0 radius of the beam waist in the focus F,
  $\lambda 0$ center frequency or, respectively, vacuum wavelength
    of the THz transmission beam 25.

The set distance 30 of the focus F from the front boundary surface of the wall 110 of the molten tube 10 is selected depending on the Rayleigh length ZR, whereby the adjusted distance 30 is chosen to be larger than the Rayleigh length ZR because the maximum angular divergence is attained outside the Rayleigh length ZR, e.g., even in the case of a narrow beam width.

Advantageously, an area between ZR and an upper value of G*ZR (G multiplied by ZR) is selected as set distance 30, i.e., a value higher than ZR by a factor G, e.g., where G=10, i.e., the tenfold value of ZR, preferably G=5 or G=2.

The angle adjusting means 28 allows the THz sensor 24 to be adjusted such that a maximum measuring signal S1 is detected so that a measurement is carried out perpendicular through the wall 110 of the molten tube 10. To that end an adjustment angle alpha is adjusted in two planes, i.e., two adjustment angles, until a maximum measuring signal is determined, i.e., in which a measurement is carried out perpendicular through the boundary surfaces. Hereby, the THz transmission beam 24 is partially reflected each on the front surface and rear surface of the wall 110 so that the reflection peaks in the reflection beam 27 can be detected whereby—with a predetermined refraction index n10 of the molten tube 10—it is possible to determine the wall thickness wd. In the event that the refraction index n10 should not be understood, it is also possible to carry out in advance a calibration measurement with an empty measuring space 28.

Thus, by means of the angle adjusting means 28 it is possible to always compensate for the current path of the blown molten tube 10 and perform a precise measurement of the wall thickness wd, whereby, owing to the de-focusing and the positioning of the wall 110 in the divergent beam area 25b, it is possible to cover a large surface area of the molten tube 10.

Thus, in each case, the front wall 110 is measured. The rear wall may be detected accordingly by a THz sensor 24 provided on the other side, i.e., the THz measuring device 20 comprises a plurality of static THz sensors 24 arranged around the measuring space 23. Further, it is possible for one or more THz sensors 24 to rotate or reverse, i.e. pivot back and forth, fully circumferentially around the molten tube.

The controlling of the THz sensors 24 and evaluation of the measuring signals S1 happens via a controller means 32. Depending on the measurement it is possible to subsequently carry out a regulation of the blow-molding extruder 1, in particular, by adjusting the ring gap 8 and/or the barrel extruder 2.

Figure 2:
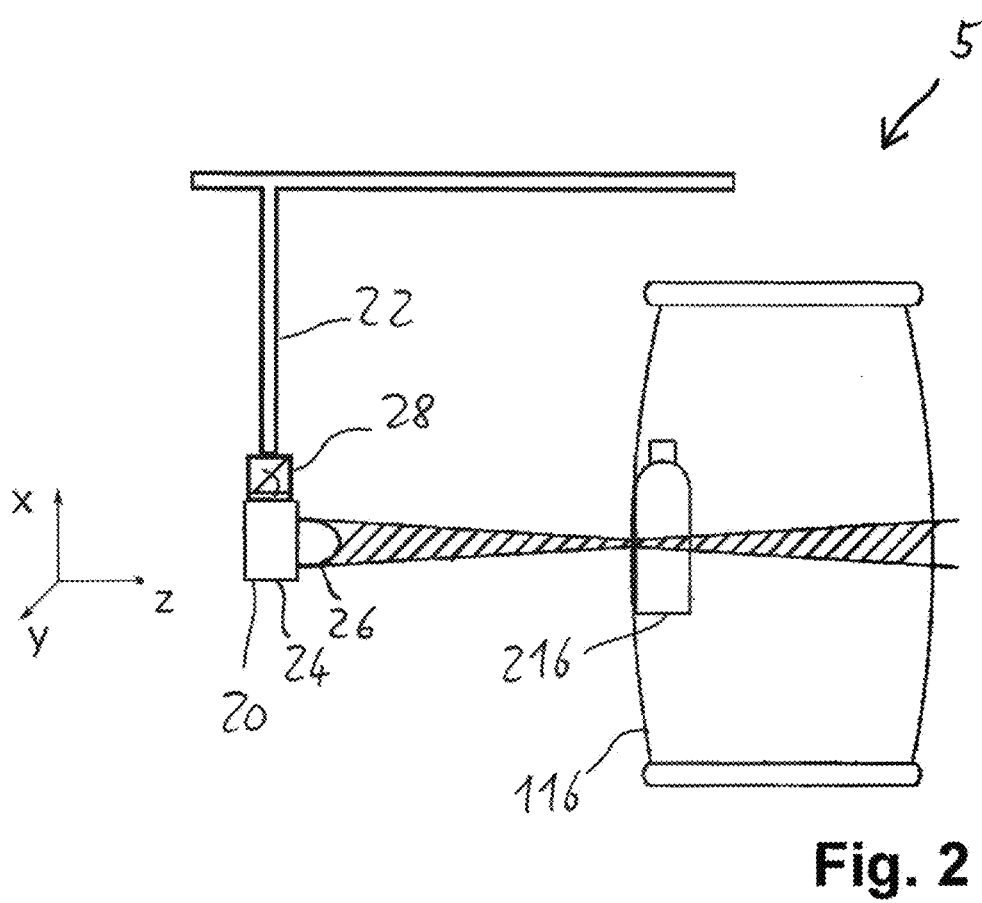
FIG. 2 shows an arrangement of a THz measuring device and various blow-molding products to be measured.

FIG. 2 shows a further embodiment providing for the measurement of finished blow-molding products 116, 216 from a suitable plastic material. Since the position of the blow-molding product 116, 216 is unknown at first, the THz transmission beam 25 may again be focused onto a corresponding set distance 30 so as to securely detect the front wall of the blow-molding product 116, 216 in the divergent beam area 25*b*.

Figure 4:
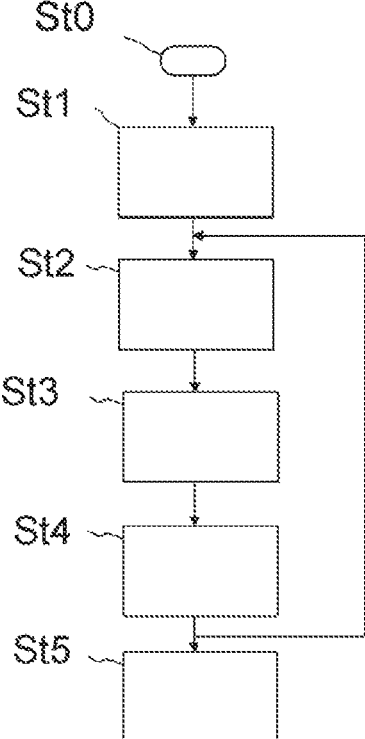
FIG. 4 shows a flow chart of a method according to the present disclosure.

Thus, FIG. 4 shows the method according to the present disclosure, starting at step ST0, where the measuring arrangement with the THz measuring device 20 is provided and positioned, subsequently in step ST1, the blow-molding extruder 1 continuously forming and blowing out a molten tube 10, or the blow-molding product 16, 116, 216 being positioned, according to step ST2, the THz sensor 24 emitting the THz transmission beam 25 along the optical axis B and focusing it as described above.

According to step ST3, the THz reflection beam 27 is received by the THz sensor 24 and evaluated, so that subsequently, in step ST4, the suitable adjustment of the angle adjusting means 28 is carried out to adjust the optical axis B perpendicular to the wall 110 of the molten tube 10 or the blow-molding product.

Thus, following such adjustment, the THz transmission beam 25 is put out again, according to step Schritt ST2, so as to measure the molten tube 10 or the blow-molding product continuously during the adjustment.

Thereafter, as described above in connection with the first embodiment, in step ST5, the molten tube 10 is grabbed directly by the tool 12 or the intermediate grab 14 and subsequently formed in the tool 12 so as to put out the blow-molding products 16 or 116, 216 respectively.

In blow-molding extruding processes a source material, e.g., plastics granulate, is melted and e.g., vertically extruded via a ring gap, so that a molten tube made of a thin molten plastics material is produced. Hereby, the molten tube may be ejected e.g., continuously or in a temporarily interrupted manner. Also, in some cases, a jet of compressed air is put out by a nozzle provided within the ring gap so that the molten tube is blown and transported along the direction of extrusion or axis of extrusion respectively, whereby the molten tube continuously changes its shape inside the jet of compressed air. Thus, the exact position of the walls of the molten tube relative to the axis of extrusion or, respectively, axis of symmetry of the blow-molding extruder is not fixed. Subsequently the molten tube is directly captured by a tool or fed to the tool via a gripper so that the blow-molding product is formed inside the tool while being pressurized by air from the inside.

In order to form the blow-molding products with suitable characteristics it is needed to precisely adjust the wall thickness. However, it is not possible to mechanically measure the wall thickness on the molten tube as such; moreover, is it usually difficult to measure the usually opaque molten tube using e.g., optical means.

For measuring plastic products such as e.g., plastics pipes, generally, THz measuring devices may be used, wherein a THz sensor directs and focusses a THz transmission beam along an optical axis towards e.g. the pipe axis of the measured object and detects partial beams reflected on boundary surfaces of the measured object so that relevant dimensions of the measured object can be determined, in particular, wall thicknesses of the walls as well as interior and exterior diameters. Hereby, in order to obtain precise measurements, the THz transmission beam has to be oriented perpendicular to the wall of the measured object so that the reflected partial beams are reflected back to the THz sensor and the wall thickness is measured perpendicular to the boundary surfaces.

A comparative THz measuring device has an angle of the THz sensor that is adjustable. Thus, it is possible to measure a pipe as the measured object even if it not precisely positioned relative to the THz sensor in that the THz sensor is pivoted in a plane perpendicular to the pipe axis and a maximum measuring signal is detected. Thus, it is possible to detect the wall and further geometric properties of a pipe even when its position is unprecise at first.

In the event of larger deviations, however, a simple angle adjustment may not be sufficient. In particular, e.g., a molten tube may be positioned so unfavorably that no relevant measuring signal will be detected even upon simple pivoting of the THz transmission beam.

A comparative nozzle for an extruder may consist of a core and an at least two-part housing comprising a fixed base corpus and an end component of the housing, where the housing encloses the core such that between core and housing a flow channel is formed through which the fluid mass can be expelled. The flow channel is sealed in the region of the separation between the base corpus of the housing and the adjacent end component be means of an elastically deformable seal, and the end component is mounted on this seal in a manner tiltable in any direction. One or more thickness measuring sensor(s) measure the actual thickness of the mass behind the nozzle.

Another comparative THz measuring device and a THz measuring method for determining a layer thickness or a distance of a measured objects may be used, wherein a Terahertz transmitter irradiates Terahertz radiation along an optical axis towards the measured object and a Terahertz receiver detects reflected Terahertz radiation, where the wall of the measured object can be measured. Hereby, a deformable reflector is provided to change the beam cross-section.

A comparative method for manufacturing hollow bodies from thermoplastic plastics, where a hose-shaped preform is formed by exiting from a nozzle slit of an extruding press head and widened in a blow mold. Also, the position of the preform in relation to the blow mold is controlled and/or regulated and, finally, the slugs created by the blow mold are severed from the hollow body after leaving the blow mold. A programming of wall thickness is carried out across the length of the preform using regulator devices. The wall thickness programming may be carried out in the longitudinal direction or the circumferential direction of the preform.

One object of the present disclosure is to provide a measuring arrangement for measuring a molten tube or a blow-molding product allowing for a secure measuring at relatively small expenditure. Another object is to provide a corresponding measuring method for measuring a molten tube or a blow-molding product.

This tasks is solved by a measuring arrangement according to the independent claims. The sub-claims describe preferred further developments. Further, a method for manufacturing a blow-molding is provided.

The method according to the present disclosure is carried out, in particular, using the measuring arrangement according to the present disclosure; the measuring arrangement according to the present disclosure is provided, in particular, for realize the method according to the present disclosure.

Thus, a purposeful defocusing of the THz transmission beam is provided, where the focus is placed such that the wall of the molten tube or the blow-molding product lies in a divergent or even convergent beam region of the emitted THz transmission beam.

This allows the detect the wall to be covered with a beam geometry in which a divergent beam is sufficiently widely fanned out so as to illuminate a larger wall area of the molten tube or the blow-molding product and, further, the radiation covers the wall at a larger angle of the convergent or divergent bundle of rays.

The distance of the focus to the wall is adjusted preferably depending on the Rayleigh length. Hereby, the Rayleigh length deepens on the wavelength or respectively center frequency of the THz transmission beam and the beam geometry. The present disclosure recognizes that the Rayleigh length provides a helpful reference to determining the distance setting of the focal point to the wall. The distance setting may be selected to be, in particular, larger than the Rayleigh length, e.g., between the Rayleigh length and a pre-determined multiple of the Rayleigh length, e.g., ten-fold, fivefold or double the Rayleigh length.

In the method according to the present disclosure and the device according to the present disclosure the THz transmission beam is preferably emitted as a continuous or temporarily interrupted transmission beam, in particular, as a frequency modulated radar wave and/or pulsed transmission beam and/or direct time-of-flight measurement, in particular, in the frequency band of 0.01 or 0.05 to 50 THz, e.g., 0.05 to 5 THz.

The present disclosure also recognizes, in particular, that in THz—measuring in the frequency band of 0.05 to 50 THz, 20 or 5 THz and a suitable optics through the Rayleigh length distance values are determined which also represent suitable distances in practice. Thus, using an upstream lens and measuring distances of the THz sensor from the measured object Rayleigh lengths of e.g., 10 mm to 100 mm, in particular, 40 mm, are determined, i.e. values in a range of a few cm. Thus, by means of the THz radiation and a focusing of this type the measured object can be securely detected so as to securely detect, in blow-molding extrusion processes, the front wall and to securely determine the wall thickness of the front wall, and potentially further geometric properties.

Preferably, using an angle adjusting means, the angle of the optical axis of the THz sensor is adjusted, in particular, in a plane perpendicular to the extrusion axis and/or in the plane determined by the optical axis and the extrusion axis. By virtue of this two-dimensional adjustment, it is possible, in particular, upon measuring the molten tube, to take better account of the occurring deformations of the molten tube than in the case of a one-dimensional adjustment, as used potentially with extruded pipes, because an extruded pipe essentially bends only in the plane perpendicular to the extrusion axis.

The present disclosure may be provided both in continuous and also discontinuous blow-molding extrusion processes.

According to the present disclosure, further, a regulation of the extrusion process is made possible, in which it is provided to control the blow-molding extruder depending on the measurement and in particular, the determination of the geometric properties of the molten tube, in particular, to adjust the ring gap or a barrel extruder, and/or the nozzle for putting out the jet of compressed air.

According to the present disclosure, further, it is possible to measure even blow-molding products already formed, in that the blow-molding product is again arranged in the geometric region behind the focus, in particular, in the measuring distance of one Rayleigh length up to a pre-determined multiple of the Rayleigh length. Hereby, it is recognized that the measuring of a finished products is generally difficult because in this case the distance of the blow-molding product in relation to the measuring device should be adjusted precisely without any suitable receptacles or holder being provided for this purpose. By virtue of the de-focusing according to the present disclosure it is possible to securely detect a sufficiently large illuminated wall area of a blow-molding product.

The blow-molding extruder preferably receives granular source material and melts it via a barrel extruder, and puts out the polymer melt via the ring gap along an extrusion axis continuously as a molten tube.

The present disclosure relates to a measuring arrangement and a method for measuring a molten tube (10) of an extrusion blow-molding process, including at least the following process steps: positioning or providing a THz measuring device (20) including a THz sensor (24) comprising an optical axis (B), extruding a molten tube (10) by a blow-molding extruder (1) along an extrusion axis (A), emitting a THz transmission beam (25) from the THz sensor (24) along its optical axis (B) in such a manner that the front wall (110) of the molten tube (10) lies in a divergent beam area of the THz transmission beam (25) behind the focus (F) or in a convergent beam area before the focus, (ST2) receiving a reflected beam (27) reflected from the molten tube (10) and evaluating a measuring signal in the reflected beam (27), adjusting an adjustment angle (90°-alpha) between the optical axis (B) of the THz sensor (24) and the extrusion axis (A) depending on the measuring signal (S1), in such a manner that the measuring signal in the reflected beam (27), for attaining perpendicular irradiation of the optical axis (B) onto the front wall (110) of the molten tube (10), and determining the wall thickness (wd) of the front wall (110).

The invention claimed is:

1. A measuring arrangement for measuring a molten tube or a blow-molding product, the measuring arrangement comprising:

a molten tube put out by a blow-molding extruder through a ring gap along an extrusion axis or a blow-molding product extruded along an extrusion axis, a THz measuring device including at least one THz sensor, the THz sensor comprising optics for focusing a THz transmission beam onto a focus, a controller means, adapted to receive measuring signals from the THz measuring device and to determine at least one wall thickness of a front wall of the molten tube or the blow-molding product, the front wall lying in one of the two following regions:

a divergent beam area of the THz transmission beam behind the focus, or in a convergent beam area before the focus;

wherein the front wall is a set distance away from the focus, the set distance being above a Rayleigh length and up to a pre-determined multiple of the Rayleigh length; and wherein the focus lies in one or both of the following positions: (i) before the extrusion axis and (ii) before an axis of symmetry of the molten tube or the blow-molding product.

2. The measuring arrangement of claim 1, wherein the controller means is adapted to further compute one or more measured values: a distance of the front wall from the THz sensor, an internal diameter, an external diameter of the molten tube, a refraction index of the material of the molten tube or of the blow-molding product.

3. The measuring arrangement of claim 1, further comprising an angle adjusting means, the THz sensor being adjustable relative to the extrusion axis by means of the angle adjusting means, and the optical axis of the THz sensor in its default position being aligned with the extrusion axis, and the angle adjusting means being designed to adjust the optical axis in one or more of the following alignments: in a measuring plane perpendicular to the extrusion axis; in a vertical plane determined by the optical axis and the extrusion axis.

4. The measuring arrangement of claim 3, wherein the controller means is adapted to control the angle adjusting means for adjusting the THz sensor, the controller means being designed to control the angle adjusting means depending on the measuring signal in such a way that a reflected measuring signal of the boundary surface of the front wall is at a maximum, so as to attain perpendicular irradiation of the THz transmission beam onto the front wall.

5. The measuring arrangement of claim 1, wherein the THz sensor is designed to emit the THz radiation in a frequency band of 0.01 to 50 THz, fully electronically, as a frequency modulated radar wave, or pulsed beam or by means of direct time-of-flight measurement.

6. The measuring arrangement of claim 1, wherein the optics is designed to focus the THz transmission beam punctiform or elliptical onto the focus.

7. The measuring arrangement of claim 1, wherein the controller means puts out a quality signal depending on the evaluation of the measuring signal and the determination of the wall thickness, by comparing the determined wall thickness with pre-determined wall thickness reference values.

8. The measuring arrangement of claim 1, further comprising a blow-molding extruder with an extrusion head and an optional pressurized air nozzle, between which a ring gap is formed for extruding the molten tube, the blow-molding extruder being designed to put out the molten tube along the extrusion axis through the ring gap by means of the jet of compressed air from the pressurized air nozzle.

9. The measuring arrangement of claim 8, wherein the controller means is designed to control the blow-molding extruder for regulation, depending on the determined wall thickness of the molten tube and/or a determined wall thickness of the finished blow-molding product.

10. The measuring arrangement of claim 9, wherein the controller means is designed to control the blow-molding extruder for regulation, by adjusting a ring gap of the blow-molding extruder.

11. The measuring arrangement of claim 9, further comprising a tool for blow-molding the molten tube, the controller means being designed and adapted to control the tool and/or a grab in such a manner that the molten tube is grabbed in consecutive shaping processes always directly by the tool or by means of a grab and transformed into a blow-molding product.

12. A method for measuring a molten tube for an extrusion blow-molding process or a blow-molding product, the method comprising the steps of providing a THz measuring device including a THz sensor which comprises an optical axis, extruding a molten tube through a blow-molding extruder along an extrusion axis or positioning a blow-molding product determined by an extrusion axis, emitting a THz transmission beam from the THz sensor along its optical axis in such a manner that a front wall of the molten tube or the blow-molding product lies in a divergent beam area of the THz transmission beam behind the focus or in a convergent beam area before the focus, wherein the front wall is a set distance away from the focus, the set distance being above a Rayleigh length and up to a pre-determined multiple of the Rayleigh length, and wherein a focus lies in one or both of the following positions: (i) before the extrusion axis and (ii) before an axis of symmetry of the molten tube or the blow-molding product, receiving a reflected beam reflected from the molten tube or the blow-molding product and evaluating a measuring signal received, and adjusting an adjustment angle between the optical axis of the THz sensors on the one hand and the extrusion axis or an orthogonal to the extrusion axis on the other, depending on the measuring signal, in such a way that the measuring signal in the reflected beam is brought to a maximum, so as to attain perpendicular irradiation of the optical axis onto the front wall of the molten tube, and determining the wall thickness of the front wall.

13. The method of claim 12, wherein the angular adjustment happens in a plane perpendicular to the extrusion axis and/or in a plane defined by the THz sensor and the extrusion axis.

14. The method of claim 12, wherein, depending on an evaluation of the measuring signal, a quality indication or quality signal is put out for evaluating the molten tube or the blow-molding product.

15. The method of claim 14, wherein the quality signal indicates a determination of an error of the wall thickness.

16. A method for blow-mold extruding blow-molding products, where a molten tube is put out by the blow-molding extruder using the method of claim 12 and measured by the THz measuring device with adjustment of the adjustment angle (90°-alpha), and subsequently, the molten tube is grabbed by a tool directly or via a grab, where the molten tube is inflated from within and its shape is determined from the outside by the tool, as a continuous or dis-continuous process.

* * * * *